United States Patent [19]

Mabrey

[11] Patent Number: 5,595,281

[45] Date of Patent: Jan. 21, 1997

[54] INVERTED CONVEYOR WITH SINGLE POINT PENDANT

[75] Inventor: Gerald B. Mabrey, Sandwich, Ill.

[73] Assignee: Richards-Wilcox, Inc., Aurora, Ill.

[21] Appl. No.: 338,030

[22] Filed: Nov. 14, 1994

[51] Int. Cl.$^6$ ................................................. B65G 47/84
[52] U.S. Cl. ........................................................ 198/687.1
[58] Field of Search ............................... 198/465.4, 680, 198/685, 687.1, 803.01

[56] References Cited

U.S. PATENT DOCUMENTS

| | | |
|---|---|---|
| 570,025 | 10/1896 | Kennedy et al. . |
| 2,565,593 | 8/1951 | Clausing ........................ 198/803.01 |
| 2,573,334 | 10/1951 | Hitz . |
| 2,869,477 | 1/1959 | Burrows . |
| 3,004,498 | 10/1961 | Parker et al. . |
| 3,008,430 | 11/1961 | Parker et al. . |
| 3,045,808 | 7/1962 | Blanc . |
| 3,753,487 | 8/1973 | Miburn-Bathgate . |
| 3,854,573 | 12/1974 | Freier, Sr. . |
| 3,869,989 | 3/1975 | Pickstone . |
| 3,905,304 | 9/1975 | Ord . |
| 3,926,303 | 12/1975 | McCall . |
| 3,960,264 | 6/1976 | Carbine et al. . |
| 4,467,911 | 8/1984 | Forshee . |
| 5,078,262 | 1/1992 | Grube et al. . |
| 5,337,887 | 8/1994 | Greenwell et al. ................ 198/803.01 |

OTHER PUBLICATIONS

Two pages from a Hupp Corp. Richards-Wilcox Division Parts Specification Manual dated Jan. 5, 1982.

*Primary Examiner*—Joseph E. Valenza
*Attorney, Agent, or Firm*—Pearne, Gordon, McCoy & Granger

[57] ABSTRACT

A chain or series of trolleys having horizontal axles is supported in an upwardly opening track. A pendant has an incurved bearing surface that rests on one of the axles. A bent support arm is secured to an upwardly extending post of the pendant and supports a load. The pendant is pivotable on the axle to maintain the post in a generally vertical attitude. An arcuate slot in the pendant receives a transverse pin on the chain to prevent inadvertent vertical movement of the pendant. The pendant is removed from the axle by tilting the pendant and lifting the pendant from the axle.

15 Claims, 2 Drawing Sheets

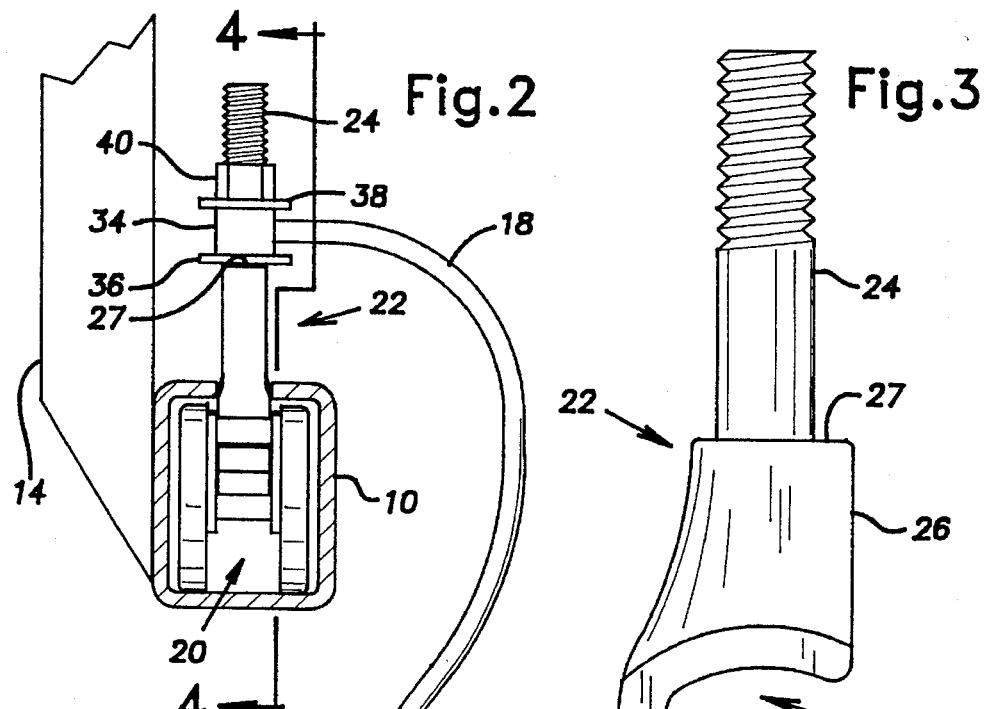
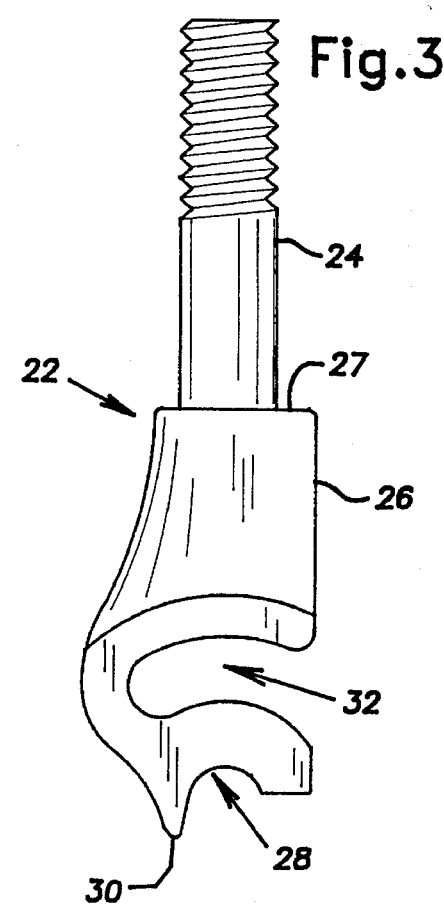
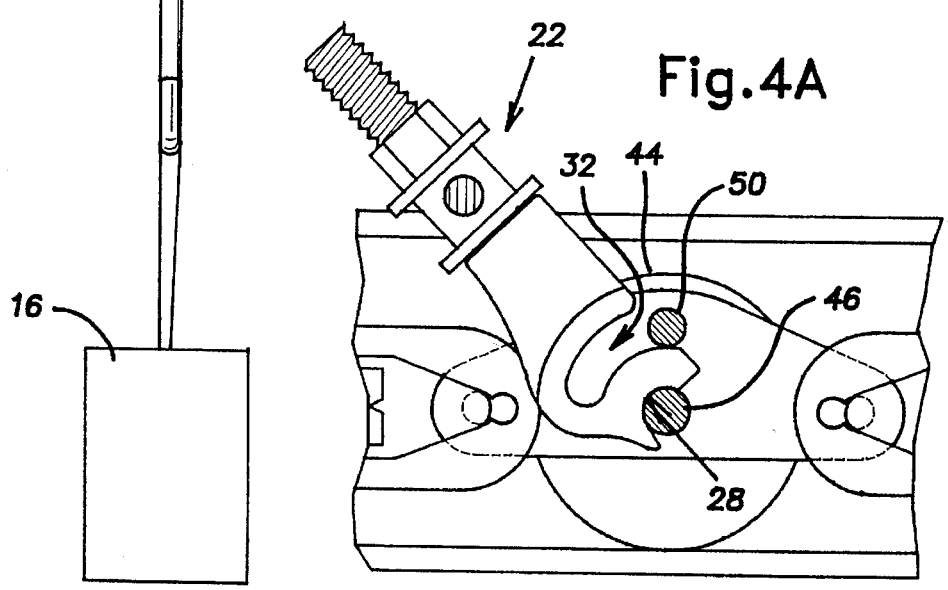

INVERTED CONVEYOR WITH SINGLE POINT PENDANT

BACKGROUND OF THE INVENTION

1. Field of the Invention

This invention relates generally to the field of conveyors and specifically to an improved pendant for an inverted conveyor.

2. Description of the Related Art

Overhead conveyors have long been used for transporting materials around a predefined course. Such conveyors frequently have a track suspended from a wall, ceiling, or other structure. The track has a generally hollow, rectangular cross-section with an upwardly or downwardly facing opening. The track often follows a closed loop path having curved and inclined portions. An endless chain or series of connected trolleys having wheels is supported by and travels inside the track. A motor drives the chain around the track. Loads are connected to the chain and suspended therefrom by a mounting apparatus, which may be permanently or removably secured to the chain to travel therewith. Examples of various overhead conveyor systems are shown in U.S. Patents Nos. 570,025; 2,573,334; 2,869,477; 3,004,498; 3,008,430; 3,045,808; 3,753,487; 3,854,573; 3,869,989; 3,905,304; 3,926,303; 3,960,264; 4,467,911; and 5,078,262, all incorporated herein by reference.

A conveyor having an upwardly facing track opening is known as an "inverted" conveyor. In one known embodiment of the inverted conveyor, the chain has a plurality of pairs of wheels riding inside the track. Each pair of wheels is connected by a horizontal axle. A shoe is supported above two pairs of axles by two pendants, one pendant resting on each axle. A support arm is pivotably secured to the shoe midway between the pendants. The load is secured to the support arm to travel therewith, suspended beneath the track.

It is desirable to have a load mounting apparatus for an inverted conveyor that is simple, light weight, and inexpensive. The apparatus should be easy to install and remove and allow the load to be suspended in a constant attitude as the load travels along inclined parts of the track.

SUMMARY OF THE INVENTION

The present invention provides an inverted conveyor apparatus having an upwardly opening track. A chain having a plurality of serially connected trolleys is supported by the track, and each trolley has a wheel rotatable on an axle. A pendant is pivotally mountable on one of the trolleys and has a bearing surface adapted to be supported by the axle. A support arm is mounted on the pendant and adapted to suspend a load below the track.

Preferably, the trolley includes a second wheel on the axle, the pendant being supported between the wheels. The support arm is rigidly mounted on the pendant. The pendant includes a vertically extending threaded post, said support arm being mounted on the post. A shoulder on the pendant supports the support arm. The support arm includes a collar fitting over the post.

The bearing surface is preferably recessed. The axle is generally cylindrical and the bearing surface defines a partially cylindrical surface generally conforming to the axle. A lip extends the bearing surface. One of the trolleys includes a transverse pin disposed parallel with the axle and the pendant includes an arcuate slot adapted to receive the pin therein. The arc of the slot is substantially concentric with a cylinder defined by the bearing surface. The support arm is bent so as to suspend the load along an axis of the pendant.

One aspect of the invention is a pendant for the inverted conveyor. The pendant has a body and a post extending vertically upwardly from the body. A partially cylindrical recessed bearing surface is located on a lower end of the body. An arcuate slot in the body has a generally constant radius from a center of a cylinder defined by the bearing surface.

BRIEF DESCRIPTION OF THE DRAWINGS

FIG. 2 shows a sectional end view of the conveyor taken from line 2—2 of FIG. 1;

FIG. 3 shows a detailed view of a pendant according to the invention;

FIG. 4A shows a detailed view of a trolley of the chain with the pendant being removed therefrom or installed thereon.

DESCRIPTION OF THE PREFERRED EMBODIMENTS

Figure 1:
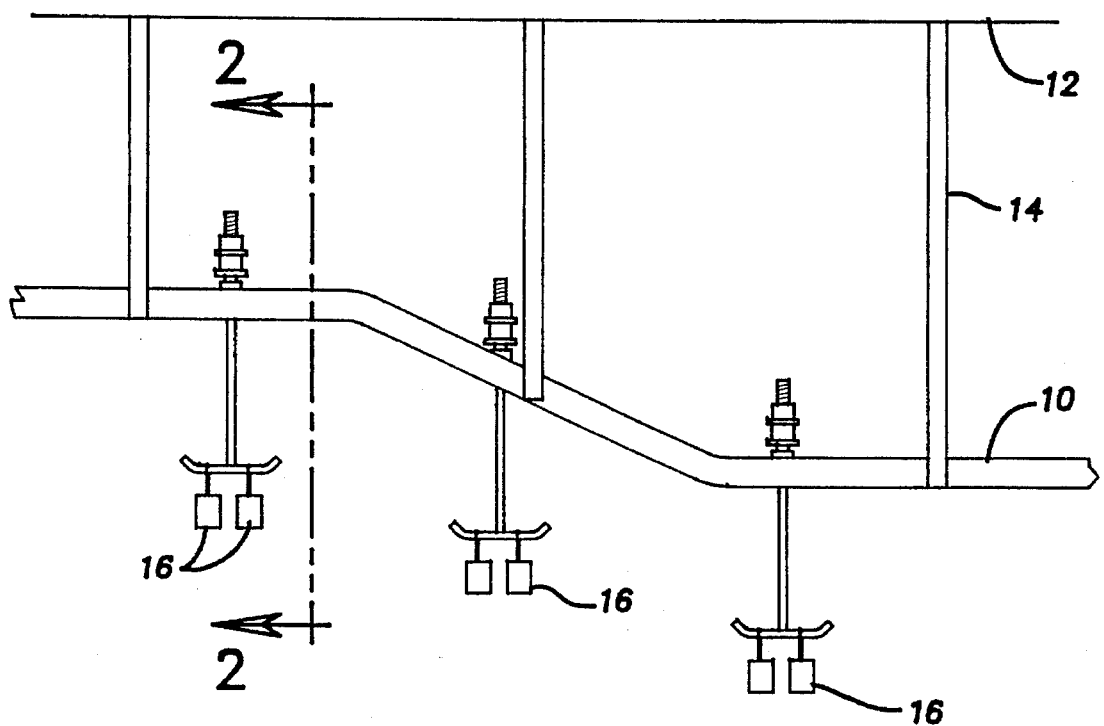
FIG. 1 shows an elevational side view of an overhead, inverted conveyor system according to the invention.

Referring to FIG. 1, a conveyor track 10 is suspended from a ceiling 12 or other structure by a plurality of supports 14. The track 10 defines a generally horizontal path having upwardly and downwardly sloping sections. A plurality of loads 16 are suspended below the track 10. The track 10 defines a path along which the loads travel to specified locations, such as assembly stations in a manufacturing operation.

Referring to FIG. 2, the load 16 is supported below the track 10 by a support arm 18. The support arm 18 is preferably bent to support the load 16 directly below the track 10. The track 10 is a generally rectangular "C" shaped hollow member made from steel or other suitable rigid material. The track 10 opens upwardly. A chain 20 disposed in the track 10 is suitable for longitudinal travel therethrough. In a preferred embodiment, the track 10 and chain 20 are endless and the chain is driven by a suitable motor (not shown). Alternatively, the chain can be adapted for linear reciprocating travel in a track having two ends. The support arm 18 is operatively connected to the chain 20 by a pendant 22.

Referring to FIG. 3, the pendant 22 includes a post 24 extending vertically from a body 26. Preferably, the post 24 is threaded along part of its length and the body 26 defines a shoulder 27 adjacent the post. A lower end of the body 26 is provided with a recessed, incurved bearing surface 28 having a lip 30. Preferably, the bearing surface 28 defines a cylinder. An arcuate slot 32 is disposed in the body 26 near the bearing surface 28. The arc of the slot 32 is generally concentric with the cylinder of the bearing surface 28. The pendant 22 is preferably cast from a suitable rigid, durable material, such as steel or aluminum.

Returning to FIG. 2, the support arm 18 is preferably removably mounted on the pendant 22. For example, the support arm 18 is provided with a cylindrical mounting collar 34 disposed on the post 24 and supported by the shoulder 27 and a washer 36. The collar 34 is held in place by a washer 38 and a nut 40 threaded on the post 24. Alternatively, the support arm can be permanently mounted on the pendant or the pendant and support arm can be a unitary structure.

Figure 4:
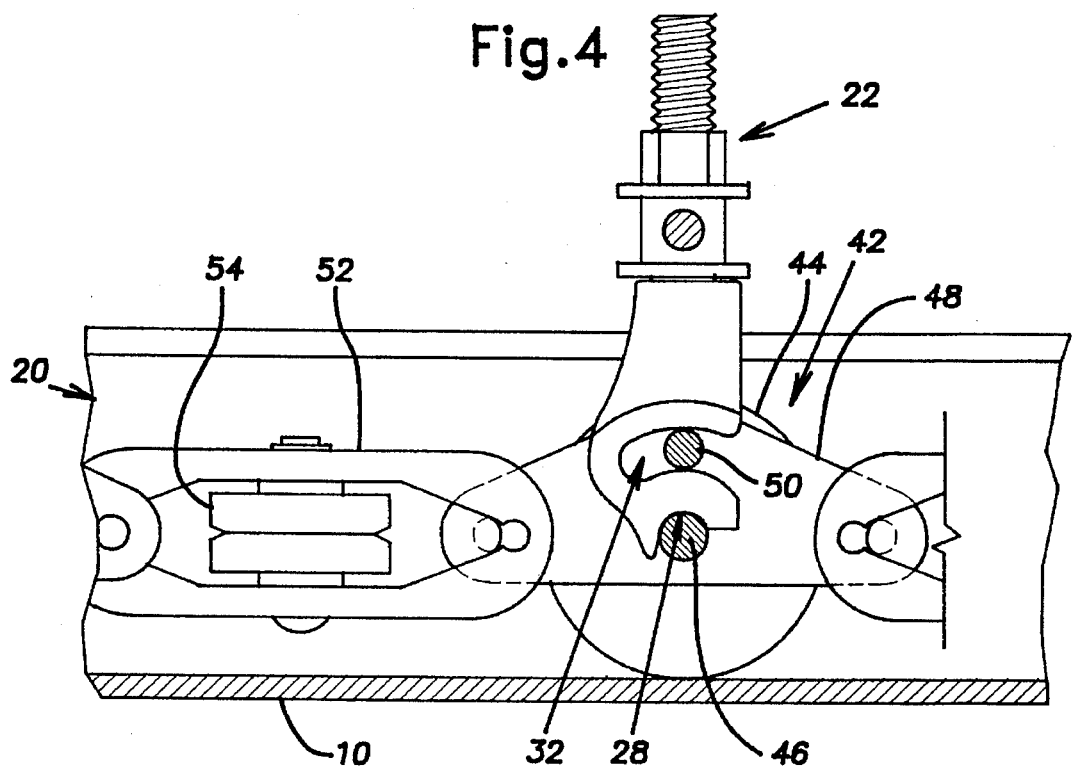
FIG. 4 shows a detailed sectional side view of a conveyor chain having the pendant installed thereon taken from line 4—4 of FIG. 2.

Referring to FIG. 4, the chain 20 is of a type known in the art having a plurality of serially connected trolleys 42. Each trolley 42 has a pair of vertical wheels 44 rotating on a horizontal axle 46. The wheels 44 ride on a lower inside surface of the track 10. The axle 46 extends through a pair of opposed plates 48 having a transverse load pin 50 extending therebetween. The trolleys 44 are connected by links 52 having lateral wheels 54. The lateral wheels 54 engage side walls of the track 10 to center the chain 20 in the track 10. The bearing surface 28 of the pendant 22 conforms to and is supported on the horizontal axle 46. The arcuate slot 32 receives the load pin 50 therein. The pendant 22 preferably defines a vertical axis through the center of the axle 46. The support arm 18 is bent so that the center of gravity of the loads 16 on the arm 18 falls substantially on the axis to balance the loads.

For installation, the support arm 18 is mounted on the pendant 22 with the nut 40 or other suitable means. The support arm 18 and pendant 22 are tilted so that the slot 32 opens somewhat upwardly. The bearing surface 28 is positioned to engage the axle 46, as shown in FIG. 4A. During positioning, the pendant 22 must clear the pin 50. The pendant 22 is then pivoted on the axle 46 to a vertical position so that the pin 50 is received in the slot 32, as shown in FIG. 4. The axle 46 supports the pendant 22 and support arm 18 while the load pin 50 prevents inadvertent vertical movement of the pendant and support arm. Loads 16 can then be suspended from the support arm 18, as shown in FIG. 1.

In operation, the chain 20 is driven along the track thereby moving the pendant, support arm, and loads. The pendant 22 is pivotable on the axle 46 to maintain the support arm 18 in a generally vertical position as the chain ascends or descends inclines or declines, as shown in FIG. 1. With the pendant 22 according to the invention, support arms 18 can be installed on any of the horizontal axles 46 of the chain 20, thereby permitting adjustable and irregular spacing. The support arm 18 is removed by tilting the pendant 22 until the slot 32 clears the pin, as shown in FIG. 4A, and lifting the pendant off the axle 46.

The present invention provides a simple device and method for suspending loads at selected positions on an inverted overhead conveyor. The present disclosure describes several embodiments of the invention, however, the invention is not limited to these embodiments. Other variations are contemplated to be within the spirit and scope of the invention and appended claims.

What is claimed is:

1. An inverted conveyor apparatus, comprising:

an upwardly opening track;

a chain having a plurality of serially connected trolleys supported by the track, each trolley having a wheel rotatable on an axle;

a pendant pivotably mountable on one of the trolleys and having a bearing surface adapted to be supported by the axle so as to permit pivoting of the pendant with respect to the trolley; and a support arm mounted on the pendant and adapted to suspend a load below the track.

2. A conveyor according to claim 1, further comprising a second wheel on the axle, the pendant being supported between the wheels.

3. A conveyor according to claim 1, wherein the support arm is rigidly mounted on the pendant.

4. A conveyor according to claim 1, wherein the pendant includes a vertically extending post, said support arm being mounted on the post.

5. A conveyor according to claim 4, further comprising a shoulder on the pendant, said shoulder supporting the support arm.

6. A conveyor according to claim 4, wherein the support arm includes a collar fitting over the post.

7. A conveyor according to claim 4, wherein said post is threaded.

8. A conveyor according to claim 1, wherein the bearing surface is arcuate.

9. A conveyor according to claim 8, wherein the axle is generally cylindrical and the bearing surface defines a partially cylindrical surface generally conforming to the axle.

10. A conveyor according to claim 8, further comprising a lip extending the bearing surface.

11. A conveyor according to claim 1, wherein the one of the trolleys includes a transverse pin disposed parallel with the axle and the pendant includes an arcuate slot adapted to receive the pin therein.

12. A conveyor according to claim 11, wherein the arc of the slot is substantially concentric with a cylinder defined by the bearing surface.

13. A conveyor according to claim 1, wherein the support arm is bent so as to suspend the load along an axis of the pendant.

14. An inverted conveyor apparatus, comprising:

an upwardly opening track;

a driven chain having a plurality of serially connected trolleys supported by the track, each trolley having a pair of wheels rotatable on a horizontal axle and a transverse pin disposed parallel with the axle;

a wheel having a vertical axle disposed between each of the pairs of wheels;

a pendant having a recessed bearing surface adapted to rest on the axle, an arcuate slot adapted to receive the pin therein, and a vertically extending post; and a bent arm mounted on the post and adapted to suspend a load below the track.

15. A pendant for an inverted conveyor, comprising:

a body;

a post extending vertically upwardly from the body;

a partially cylindrical recessed bearing surface on a lower end of the body; and an arcuate slot in the body having a generally constant radius from a center of a cylinder defined by the bearing surface wherein the center is substantially aligned with a longitudinal axis of the post and the axis intersects the slot.

\* \* \* \* \*